United States Patent Office 2,948,144
Patented Aug. 9, 1960

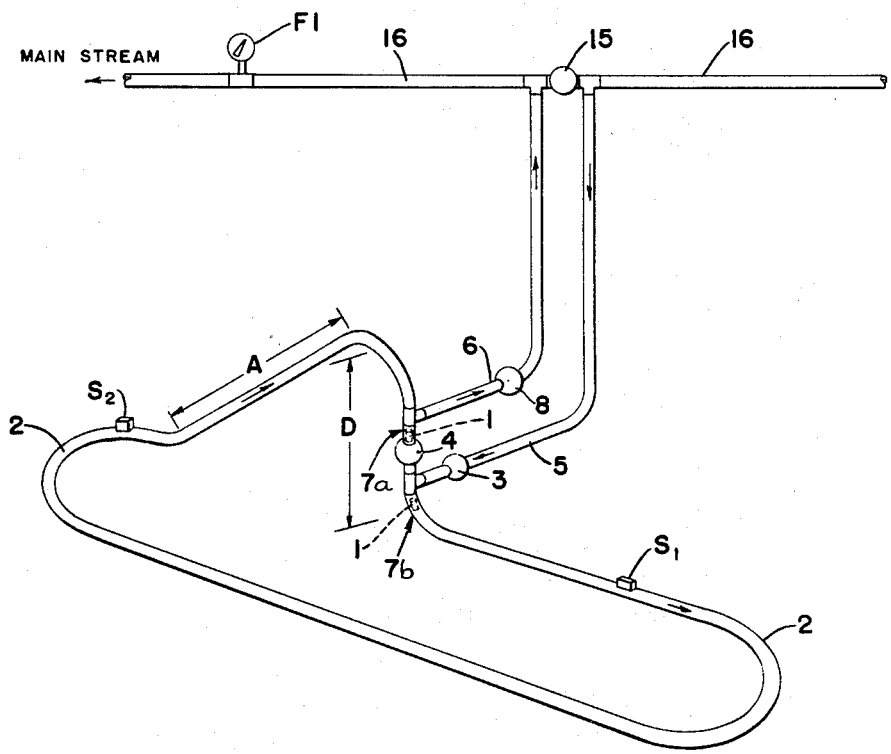

2,948,144

CALIBRATION LOOP FOR CALIBRATING FLOWMETERS

Hugh D. Applequist, Euclid, Ohio, assignor to The Standard Oil Company, Cleveland, Ohio, a corporation of Ohio Filed Oct. 3, 1957, Ser. No. 687,895

3 Claims. (Cl. 73—3)

This invention relates to an apparatus for calibrating flowmeters while said flowmeters are functioning on pipeline streams. More particularly, it relates to a calibration loop which permits continuous operation of such a loop, eliminating the necessity after one calibration cycle of opening the loop or employing some mechanical, electrical, or hydraulic device to reposition a scraper or plug from the ending position of the loop to the starting position of the loop.

A calibration loop is an apparatus frequently utilized in the petroleum and chemical process industries to determine the accuracy of flowmeters while said meters are functioning on pipeline streams.

Such a system is disclosed in U.S. Patent No. 2,772,561. Briefly described, these systems function by forcing, with a liquid under pressure, an object (hereinafter referred to as a "plug") which forms a movable seal inside the pipe through a length of piping that is formed into a loop. The liquid is diverted from the pipeline stream into the loop by an inlet line and a system of valves, and the liquid forces the plug around the loop. A short distance downstream in the loop the plug trips a switch which closes an electrical circuit, thereby actuating a counter on the product flowmeter under test and initiating a timing device. This electrical circuit remains closed while the plug continues the course of the loop until the plug reaches a position near the end of the loop when the plug trips a second switch which opens the electrical circuit deactuating the counter on the flowmeter and stopping the timing device. Shortly downstream from this second switch, the liquid leaves the loop to re-enter the product stream by means of a discharge line from the loop. The plug comes to rest just beyond the discharge line due to the loss of liquid pressure. A calibration can then be made by a comparison between the flowmeter reading and a calculated flow rate derived from the known volume within the pipe between the two switches and the time that was recorded for the plug to traverse the distance between the switches. Such a calibration loop can be provided with pressure gauges and temperature measuring devices to compare the conditions of the calibration run with average conditions on past determinations. Then a final meter adjustment can be made on the basis of known physical properties, such as thermal expansion and compressibility of the liquid being measured.

One disadvantage, however, in utilizing such a calibration loop has been the inconvenience of repositioning the plug from the point where it comes to rest just beyond the loop discharge line to a position just forward of the loop inlet line to prepare the loop for another calibration determination.

Several methods are presently utilized for repositioning the plug, but all result in an extensive use of time and labor. One method now in practice requires physically removing the plug from the line at the end of the loop and admitting it to the line at the start of loop. With this method flanges or end plates must be removed manually, incuring labor costs and causing spillage of product. Such spillage results in loss of product value and detracts from good housekeeping in the plant. Furthermore, product spillage can be a source of possible hazards should the material be combustible or toxic.

Another known method for repositioning the plug involves moving the plug backwards through the loop of pipe by reversing the flow of the fluid. This method is not desirable since it unduly deteriorates a plug which must be especially designed and constructed to provide an adequate seal when traveling in the direction of measurement flow. In addition, this method requires a complicated system of valves which must be operated manually or the installation of complicated equipment to drive the valves mechanically.

It is a primary object of this invention to provide a calibration loop operable for the purposes already discussed with a new and unique design which will overcome the burdensome methods previously described for repositioning the plug after completion of one determination so that the loop will be prepared for a new calibration.

This novel structure comprises a continuous conduit circuit having a substantially horizontal conduit calibrating loop section, an ascending conduit section, and a descending conduit section connecting the upper end of the ascending section to the horizontal calibrating loop section. The descending conduit section is provided with openings to an inlet and an outlet line. A valve is disposed between these openings for closing flow in the loop.

In this manner, after the timing cycle has been completed in the calibrating loop, the plug continues by the force of liquid pressure up the ascending section and then drops within the descending section so that the plug rests above the valve when it is closed. It is then in a position to enter the horizontal loop for the next cycle.

A more complete understanding of the invention and its advantages can be obtained from the following detailed description taken together with the accompanying drawings showing a schematic view illustrating the manner in which such a continuous conduit circuit is connected to pipeline streams for testing flowmeters which are functioning on these pipelines and further illustrates a preferred embodiment of any invention in which an inclined conduit section is connected at one end to a horizontal calibrating loop, and a vertical conduit section connects the other end of said inclined section to said horizontal calibrating loop.

Referring to the drawing, a continuous conduit circuit is shown in which the horizontal calibration loop 2 connects to the ascending conduit section A and the descending conduit section D. These conduit sections are interconnected in the above sequence in a manner so that all changes in direction are through gradual radii, thereby permitting the unobstructed travel of plug 1 through the system.

Plug 1 corresponds in cross section to the interior of the horizontal conduit calibrating loop section and the ascending conduit section and is constructed to form a tight seal within the conduits to prevent liquid from flowing past the plug. In this way, pressure applied by the liquid behind the plug will force it through the pipe. It is preferred that the inside diameter of descending conduit section D be slightly larger than the inside diameter of the balance of the conduit circuit to facilitate a free drop of the plug 1 within this section without the aid of liquid pressure.

Switches S1 and S2 are located in the calibrating loop 2 as shown. The switches S1 and S2 are not part of my invention, and any known structure for these can be utilized. Generally, a small detent projects into the pipe which is tripped by the movement of the plug acting on this detent.

An inlet line 5 in which a valve 3 is located and outlet line 6 is connected to the descending conduit section D as illustrated in the drawing. A valve 8 may be incorporated in line 6, but this is not essential. Valve 4 is located in descending conduit section D between the inlet line 5 and outlet line 6.

The inlet line 5 and the outlet line 6 are each connected to the main flowing stream 16 in which a valve 15 is interposed between the points at which the inlet line 5 and the outlet line 6 are connected to the main stream. A flowmeter F1 is disposed within main stream 16 as shown in the drawing.

The operation of my invention will now be described. It is assumed that plug 1 is at rest at position 7a after the completion of the previous calibration run and valves 3, 4, and 8 are closed. When it is desired to make a new calibration run, the plug must be moved from position 7a to a point beyond the inlet entrance in the descending conduit section such as at position 7b. To do this, valve 4 is opened and plug 1 falls of its own weight in the descending conduit section D and moves to the position 7b.

In the normal operation of the stream, the valve 15 is open, the valves 3, 4, and 8 are closed so that the main stream flows directly through the line 16 and the flowmeter F1 can measure the rate of flow in the stream. When it is desired to calibrate the flowmeter, the valve 4 is closed following which valves 3 and 8 are opened and valve 15 is closed so that the stream flows through the inlet 5, around the loop 2, through and out the outlet 6, and back into the main stream. The rate at which the fluid is flowing in the loop is necessarily the same rate as that at which it is flowing in the main stream and hence a calibration of flowmeter F1 can be obtained in the manner previously described.

The liquid after entering loop 2 has adequate opportunity to gain momentum as it forces the plug up to the position of switch S1 and will be moving the plug at the full rate of flow by the time switch S1 is actuated. The plug will then travel around the loop until its actuates switch S2, and continued flow will force it up the ascending conduit section A, whereupon the plug will fall in the descending conduit section D to position 7a immediately above valve 4.

It will be obvious that the ascending conduit A must be designed to acquire sufficient height so as to correspond in elevation to the descending section D so that on the opening of valve 4 the plug 1 will fall in the descending section D and move to position 7b.

Obviously, variations of the structure described and the mode of operation may be made without departing from the inventive concept herein disclosed, and I intend all of the same to be within my invention as are included within the scope of the following claims.

I claim:

1. An apparatus for calibrating liquid flowmeters comprising a first section of conduit disposed in a substantially horizontal plane forming a part of a calibration loop, a second section of conduit joined to said first section and ascending gradually therefrom, a third section of conduit joining and descending from said second section to said first section so as to complete said calibration loop and having a separate inlet and outlet therein to permit the introduction and withdrawal of liquid from said calibration loop, a plug device disposed within said loop, valve means disposed in said third conduit section between said inlet and outlet whereby the travel of said plug device within said calibration loop may be interrupted, and a pair of sensing means disposed within said loop in a spaced relation whereby the travel of said plug device past said sensing means will be indicated.

2. An apparatus for calibrating liquid flowmeters comprising a first section of conduit disposed in a substantially horizontal plane forming a part of a calibration loop, a second section of conduit joined to said first section and ascending gradually therefrom, a third section of conduit joining said second section and said first section and descending between said second section and said first section so as to complete said calibration loop, an inlet pipe and an outlet pipe connected to said third section, a valve in said inlet pipe, a valve in said outlet pipe, a plug device disposed within said loop, valve means disposed within said third conduit section between said inlet and said outlet pipe whereby the travel of said plug device within said calibration loop may be interrupted, and a pair of sensing means disposed within said first conduit section in longitudinally spaced relationship whereby the travel of said plug device past said sensing means will be indicated.

3. A continuous loop for calibrating liquid flowmeters comprising a first section of conduit, a plug device disposed within said conduit, a pair of sensing means disposed within said first section of conduit in a spaced relation whereby the travel of said plug device past said sensing means will be indicated, a second section of conduit joined to the end of said first section and ascending gradually therefrom, a third section of conduit joined to and descending from said second section to said first section whereby said loop is completed and said plug device may be returned to said first section for a new run past said sensing means, an inlet and an outlet in said third section of conduit to permit the introduction and withdrawal of liquid from said calibration loop, and a valve means disposed in said third conduit section between said inlet and outlet whereby the travel of said plug device within said calibration loop may be interrupted.

References Cited in the file of this patent

UNITED STATES PATENTS

| | | |
|---|---|---|
| 2,669,936 | Elkens et al. | Feb. 23, 1954 |
| 2,772,561 | Plank et al. | Dec. 4, 1956 |

FOREIGN PATENTS

| | | |
|---|---|---|
| 681,642 | Germany | Sept. 27, 1939 |